United States Patent
Tonelli et al.

[11] Patent Number: 5,558,774
[45] Date of Patent: Sep. 24, 1996

[54] AERATED HOT MEMBRANE BIOREACTOR PROCESS FOR TREATING RECALCITRANT COMPOUNDS

[75] Inventors: Fernando A. Tonelli, Dundas; Henry Behmann, Puslinch, both of Canada

[73] Assignee: Zenon Environmental Inc., Burlington, Canada

[21] Appl. No.: 410,730

[22] Filed: Mar. 27, 1995

Related U.S. Application Data

[63] Continuation-in-part of Ser. No. 48,915, Apr. 19, 1993, Pat. No. 5,401,400, which is a continuation of Ser. No. 773,226, Oct. 9, 1991, Pat. No. 5,204,001.

[51] Int. Cl.$^6$ ........................................ C02F 3/12
[52] U.S. Cl. .................... 210/612; 210/622; 210/626; 210/908
[58] Field of Search ............................. 210/608, 616, 210/617, 612, 621–623, 626, 631, 150, 151, 195.1, 195.2, 195.3, 610, 611, 908, 909

[56] References Cited

U.S. PATENT DOCUMENTS

| | | | |
|---|---|---|---|
| 3,472,765 | 10/1969 | Budd et al. | 210/195.2 |
| 4,655,928 | 4/1987 | Milton et al. | 210/195.2 |
| 4,749,494 | 6/1988 | Tomoyasu et al. | 210/626 |
| 4,787,978 | 11/1988 | Nicol | 210/622 |
| 4,883,594 | 11/1989 | Sekoulov et al. | 210/622 |
| 4,904,387 | 2/1990 | Jordan | 210/622 |

Primary Examiner—Thomas G. Wyse
Attorney, Agent, or Firm—Alfred D. Lobo

[57] ABSTRACT

A wastewater feed containing an ultimate BOD/COD ratio >0.6 is well-suited for especially acclimated thermophilic and/or caldo-active living micro-organisms ("hot cells") which thrive in an autothermal aerobic (ATA) reaction zone having an ATA bioreactor ("ATAB") operating at substantially ambient atmospheric pressure in combination with a MF or UF membrane filtration device from which a solids-free permeate may be withdrawn. This combination, of ATAB and membrane device is a "membrane bioreactor" (ATA MBR), which operates autothermally with a feed containing biodegradable organic materials having a BOD of at least 5,000 mg/L, preferably at least 10,000 mg/L (10 g/L) with a minor portion of "municipal" wastewater or domestic sewage. Operation of the ATAB, preferably in the thermophilic range from 45° C.–75° C., with constant HRT from 1 to 12 days, is contingent upon maintaining a stable population of live hot cells. Such cells enhance the biokinetics of degradation and allow operation of the ATAB at higher COD loading and a lower concentration of TSS, than would be possible at a lower temperature. A surprisingly high membrane productivity allows production of much less sludge to be disposed of outside the system, than would have to be disposed of with a conventional mesophilic reactor in normal operation with a HRT of less than 24 hr. A combination of an MP MBR with an ATA MBR is highly effective when the MPB produces high BOD concentration mixed liquor for destruction by the ATAB.

10 Claims, 4 Drawing Sheets

AERATED HOT MEMBRANE BIOREACTOR PROCESS FOR TREATING RECALCITRANT COMPOUNDS

CROSS-REFERENCE TO THE RELATED APPLICATION

This application is a continuation-in-part application of Ser. No. 08/048,915 filed 19 Apr. 1993, to issue as U.S. Pat. No. 5,401,400 which, in turn is a continuation application of Ser. No. 07/773,226 filed Oct. 9, 1991, issued as U.S. Pat. No. 5,204,001 on 20 April 1993.

BACKGROUND OF THE INVENTION

This invention is directed to the problem of minimizing the production of sludge, particularly sludges relatively more toxic than municipal domestic sludge, by using an autothermal aerobic digestion process to efficiently convert biodegradable organic matter, in wastewater streams, to harmless carbon dioxide and water, with aerobic, thermophilic, living microorganisms employed in a substantially autothermal aerobic ("ATA") process in which an autothermal aerobic bioreactor ("ATAB") and a membrane means, together referred to as an ATA membrane bioreactor ("ATA MBR") are used. Such living microorganisms are generally referred to hereinafter, as "cells" because they are essentially unicellular, and the term "cells" is convenient and brief. The acronym "ATA" is used herein specifically to identify the type of process disclosed herein, so as not to confuse it with a prior art process disclosed in U.S. Pat. No. 4,915,840, issued to Rozich et al. and referred to as an "ATAD" process. The essential feature of the operation of the ATA MBR is that it is "substantially autothermal", that is, no more than 20% of the heat required to maintain the reaction is provided by an external source, preferably less than 10%, and most preferably none. The biochemical oxidation reaction, by itself, generates sufficient heat to maintain a temperature at which the cells thrive.

The '840 process also uses an autothermal bioreactor, but in addition, requires a hydrolyzer significantly to reduce the amount of sludge generated.

More specifically, this invention relates to purifying any wastewater stream suitable for treatment with (i) thermophilic cells which thrive in an environment at a temperature in the range from 40° C. to about 75° C., more preferably from 55°–75° C., and, (ii) caldo-active cells which thrive in an environment at a temperature in the range from 80° C. to about 85° C., or even higher (see New Scientist, Vol. 137, 1854, 1993). In the range from 75° C. to 80° C. the cells may be said to be both thermophilic and/or caldo-active.

For brevity and convenience, thermophilic and/or caldo-active cells are referred to herein, simply as "hot cells" because each has been especially acclimated to function effectively as a "hot" activated sludge, and the ATA MBR as a "hot" system, as opposed to a mesophilic aerobic bioreactor ("MPB") in combination with a membrane means referred to as a MPB MBR "cool" system. Properly acclimated hot cells will ingest even the recalcitrant compounds in a "waste fluid" stream which they then come to regard as a substantially completely biodegradable "feed". The particular hot cells chosen for use in this "hot" process depends upon the % chemical oxidation demand (% COD) removal desired, the rate at which the removal is to be effected, and other factors.

The dominant characteristic of hot cells is that, under the controlled conditions of the process of this invention, they grow and replicate ("log-growth phase") only slightly more rapidly than they "self-destruct" or are "self-consumed", that is, consumed by other cells of the same species in a "log-death phase", as will be explained below. This process is therefore intolerant to the loss of as little as 10% of the number of live cells in the ATAB at any time during its operation. Remembering that most of the biomass in the mixed liquor consists of dead cells, it is critical that one maintain the required total suspended solids (TSS) in the ATAB. An unacceptable loss of live cells occurs when either (i) more than 10% of the "mixed liquor" from the ATAB is lost, or (ii) 10% more of the live cells are consumed than there are living cells regenerated, that is the "death-rate" is greater than 10%. This requirement relating to guarding against loss of live hot cells from an ATAB is referred to herein as the "essentially no-loss requirement". It is equally important that the rate at which living cells are regenerated be restricted to no more than 10% greater than the rate at which they are consumed, because this results in generation of biomass rather than its destruction. This restriction is particularly applicable when an ATAB is operating at the low end of its temperature range (about 45° C.). The critical "essentially no loss" requirement is usually of greater concern than over-reproduction because there is less than a 10% net generation of live cells in a ATAD reactor operating in the range from 55° C.–75° C., and the higher the temperature range of operation the slower the rate of reproduction. For successful operation of the ATAB the population of living cells, that is CFU/ml (colony-forming units/ml), is stabilized within±10% of an optimal determined by routine trial and error such as one skilled in the art undertakes, thus meeting the criticality of the "stable living cell population" requirement. Depending upon the nature of the feed and the temperature of operation, the CFU/ml in the ATAB may range from $10^6$ or lower, up to $10^{12}$ or above, equivalent to a concentration of 5 to 25 gm biomass per liter, the number of live cells being difficult to determine. "Mixed liquor" refers to activated sludge biomass including cells, dead and alive. In the ATAB, thermophilic cells are especially acclimated to the task they are to perform in the elevated temperature, "hot" environment of the ATA biooxidation zone. Note however, that thermophilic cells may metabolize in a reactor which is not autothermal.

The "essentially no-loss requirement" is met by combining an ultrafiltration (UF) and/or microfiltration (MF) means with a thermophilic or caldo-active "hot" bioreactor. The term "hot bioreactor" as used herein refers to use of "hot" cells in a MBR in which organic matter in wastewater is biochemically oxidized. With a "hot" ATAB, the lower limit at which this ATA process operates is dictated by the biological oxygen demand ("BOD") of the feed. The BOD is too low when the ATAB cannot operate substantially autothermally. All references herein to BOD refer to "theoretical or ultimate BOD", meaning that the BOD is measured using duly acclimated cells, after digestion for an infinitely long time at 60° C., which in essence, is a measure of all biodegradable material present. Preferably a feed has a COD loading in the range from 4–50 kg/m³/day (24 hr), preferably 10–30 kg/m³/day, and the ATA MBR delivers an effluent of permeate which is free of TSS. It has been found that the feed COD may be increased as the COD loading decreases in the bioreactor due to cell growth, provided of course, at least enough molecular oxygen as is required by the growing cells, is delivered to the mixed liquor in the ATAB.

The basic technology, using a MBR was disclosed a quarter of a century ago in U.S. Pat. No. 3,472,765 to Budd et al. They suggested a combination using a UF or reverse osmosis ("RO") membrane, not only to avoid the time penalty of using gravity settling technology to separate sludge from mixed liquor, but also to provide essentially solids-free reusable and sewerable ("permeate") water to be recovered. The solids-containing stream ("concentrate") from the membrane separator was recycled to the bioreactor, and eventually the undegraded high molecular weight materials and salts were purged.

The essential process characteristic of the '765 patent was the requirement that a constant volume of mixed liquor is maintained in the reactor ("constant reactor volume") by varying the flow of feed. This choice was made with the recognition that a MBR for readily biodegradable sludge, is preferably run at constant relatively low hydraulic retention time ("HRT") in the range from 20 min–30 min. Specifically in the '765 patent, the aim was to convert municipal sewage by generating biomass deemed to be a valuable byproduct, not to destroy it. This limitation of constant HRT requires that both, the flow to the reaction vessel and, the volume of mixed liquor in it, be maintained constant.

The '765 process chose to maintain the reactor volume constant by varying the flow. This choice is unexpectedly inapt because, in practice, varying the flow causes the short HRT to vary too widely. The ATA process requires that the HRT be essentially constant in each of two different operating embodiments; (1) the first, in which the flow rate of feed to the reactor is held essentially constant, and, essentially all concentrate and a minor portion, from about 0.1% to less than 50% of the permeate, is recycled to the ATAB; and (2) the second, in which essentially all concentrate and no portion of the permeate is recycled to the ATAB. Thus, neither embodiment maintains an essentially constant reactor volume by varying the feed flow. By "essentially constant" is meant±10%, preferably±5%. Details of operation for each of the two embodiments are presented hereunder.

The flux of a membrane system declines as a function of operating time from an initial 'high' value, to a value about 50% of the high value, and progressively gets lower until the membrane is cleaned. To accommodate constant flow to the reactor, a membrane filtration system is sized for the minimum flux, just before cleaning ('worst case flux'). This operating requirement results in excess capacity of the membrane system at all times except when the membrane is fouled. Since the level in the reactor would soon decrease if the entire permeate is disposed of, the flow of permeate is modulated. Such modulation of permeate flow may be done by one of two, first and second, methods; or, first by one (the first) method, then with the other (the second) method, depending upon the nature of the membrane used, as is described in the detailed description below.

In either embodiment of the process, it is essential for effective utilization of organic matter by hot cells, that large biodegradable solids, too large to be easily metabolized by the cells, be comminuted to finely divided solids in the size range from about 90–180 μm (US Standard Test Sieve Series Wire Cloth in the range from No. 80 to No. 170) or smaller. Preferably, essentially no solids greater than about 106 μm (U.S. Standard Test Sieve Series Wire Cloth No. 140) enter the reactor. The only solids other than the hot cells in the mixed liquor, are the aforementioned finely divided organic solids, and the products generated in the mixed liquor.

In 'design' examples the '840 process shows only a marginal reduction in sludge with the implementation of the hydrolysis assist (compare Tables 1 and 2). In each case, the '840 process requires that feed to its ATAD reactor be essentially all biomass (cells) generated by pretreatment of incoming wastewater in a MPB. In operation for its design purpose, a portion of that biomass is prehydrolyzed to provide nutrition for the cells in the thermophilic reactor, so that feed to the ATAD reactor is a combination of the biomass from the MPB and the prehydrolyzed biomass. Further, the effluent from the ATAD zone must be flowed to the MPB for further biooxidation, and to generate a more settlable sludge than is discharged from the ATAD reactor. Since no membrane separator is used with either reactor, a purified effluent can be discharged only after effluent from the MPB is settled.

As will presently be evident, a single ATA MBR (used in a "single stage process") allows the novel ATA process of this invention to discharge a purified effluent, free of all suspended solids, without further biooxidation, directly after mixed liquor is filtered in a MF or UF membrane filtration zone.

Typically, wastewater streams most economically treated in this ATA process are generated in industrial/chemical and agricultural manufacturing facilities, referred to herein as "chemicals wastewater" and "agricultural wastewater" respectively, though relatively easily biodegradable wastewater in local municipalities, referred to herein as "municipal" or "domestic" wastewater for brevity and convenience, may also be treated. By "relatively easily biodegradable wastewater" is meant a feed having a BOD in the range from about 100–10,000 mg/L, which requires an HRT of less than 24 hr (referred to herein as "HRT24") in a conventional MPB operating at 10° C.–30° C. with mixed liquor having volatile suspended solids (VSS) in the range from 1000–5000 mg/L. Since an MPB typically treats a feed with an ultimate BOD of less than 1,000 mg/L, the HRT is typically less than 8 hr. The rate of flow of such wastewater streams typically varies from one hour to the next, and daily rates may vary by as much as an order of magnitude (tenfold) or more.

Because "chemicals wastewater" and "agricultural wastewater" streams may contain a mixture of "recalcitrant" compounds and "refractory" compounds, not typically present in "municipal" wastewater, hereafter, the former (one or more of the combination of chemicals, and industrial and agricultural wastewaters) will be referred to as "waste fluid" in those instances where the emphasis is on their atypical content, and to distinguish them from "municipal" wastewater. Because the term "wastewater feed" or "feed" for brevity, is used herein to refer to the entire volume of a liquid feedstream to this ATA process, whether domestic wastewater or waste fluid, all waste fluid is "feed", but not all "feed" is waste fluid.

An ATA MBR is typically used (single stage embodiment), for "feed" containing low BOD loadings below 5000 mg/L when the feed is available at a temperature near the operating temperature of the ATAB, and for high BOD loadings above 5,000 mg/L, with a wide variety of "chemicals" including $C_6$–$C_{14}$ esters, carbohydrates and fatty acids, which will often include some domestic sewage, the proportion of which sewage relative to the concentration of chemicals, varies daily. A chemicals "waste fluid" stream may contain small quantities of "recalcitrant", "highly recalcitrant" and "refractory", compounds and typically does. Chemicals in waste fluids may include recalcitrant or very recalcitrant aliphatic, cycloaliphatic and aromatic hydrocarbons, and numerous oxygen-containing derivatives thereof. It may be required to treat recalcitrant and highly recalcitrant compounds at a COD of about 5000 mg/L to yield a permeate with essentially no COD (<100 mg/L); but if mixed with wastewater containing relatively easily biodegraded organic material which provides at least 10% of the COD loading of the reactor, a COD above 10,000 mg/L in the feed may yield a comparable permeate.

By a "recalcitrant" compound is meant one which would not be significantly biodegraded in a typical conventional municipal water treatment/activated sludge facility operating with a relatively short HRT, <24 hr. Many recalcitrant compounds, however, are biodegraded by cells duly acclimated to those compounds with a reasonably short HRT less than 5 days, often as little as 1 day, even at a relatively high COD loading of 5 kg/m$^3$/day. An agricultural waste fluid may contain simple and complex carbohydrate waste, muscle tissue, hair, and $C_4$–$C_{24}$ branched chain fatty acids, both saturated and unsaturated, each of which may be a recalcitrant compound. A chemicals waste fluid may contain compounds such as chlorinated hydrocarbons with varying content, by weight, of chlorine in each molecule of chlorinated hydrocarbon, such as a stream produced in a vinyl chloride plant; synthetic esters and oils such as are used in metalworking fluids discharged from a metal-working facility; tannery and Abbatoir wastes; wastewater containing manufactured organic solvents and other compounds, and the like.

By a "highly recalcitrant" compound is meant one which is biodegraded with difficulty even by cells which are duly acclimated to such a compound, that is, the compound is eventually biodegraded by cells acclimated to the compound, but requires a HRT in the range from about 5 to 10 days at the same COD loading of 5 kg/m$^3$/day used before. Finally, "refractory" compounds are those which will not be biodegraded by cells acclimated to recalcitrant and highly recalcitrant compounds, irrespective of any realistic length of HRT and COD. As one would expect, mineral impurities such as silica, oxides of numerous metals, and the like are not biodegradable. In a different category from minerals, inorganic compounds such as metal salts and numerous organic compounds which are highly toxic to animal and plant life are also deemed "refractory". Such compounds include the metal sulfates, thiosulfates, chlorides, etc. and highly halogenated compounds such as chlorinated aromatic, aliphatic and cycloaliphatic compounds, e.g. hexachlorobenzene, halogenated long $C_{12}$–$C_{16}$ branched chain esters of various fatty acids, and, trichlorophenols.

Even a relatively small content of such recalcitrant and highly recalcitrant compounds in the range from 10 ppm–100 ppm, requires that cells be used which are duly acclimated to their task, or those compounds will not be degraded.

A particular example of a waste fluid stream (a particular stream referred to herein is an ester-containing aqueous stream) is one which is produced in a chemical plant for the manufacture of dialkyl phthalates by the esterification of phthalic arthydride with mixtures of n-octyl and n-decyl alcohol, and a relatively smaller amount of n-hexyl alcohol than either of the other alcohols. In such a stream, the esters are formed in a wide range, from di-$C_6$-alkyl to di-$C_{13}$-alkyl esters, all of which do not have the same degree of biodegradability. For this reason, in addition to testing a combined stream of various laboratory-grade esters which were mixed to simulate a composition which might be present in such a waste fluid, several individual esters were also tested.

A particular ester-containing aqueous stream, like most "feeds" suitable for this ATA process, contains a predominant amount of biodegradable organic matter, the ratio of theoretical or ultimate BOD to COD usually being >0.6 (greater than 0.6), preferably in the range from 0.8 to 1.0, which is the range for domestic wastewater containing domestic sewage.

The precise organic content of any feed will depend upon its source, just as even the components and flow of a domestic sewage stream may vary. Streams other than domestic, vary not only in flow rate and the components, but also in temperature and the concentration of their individual components (referred to as "chemicals" in a waste fluid).

The problem of sludge disposal from an ATAB is addressed herein as being specifically directed to the biochemical conversion of chemicals and agricultural waste fluids containing from 1,000 ppm–200,000 ppm (parts per million, or mg/L) preferably from 10,000–100,000 mg/L of biodegradable but recalcitrant organic compounds. Such a high level of biodegradable compounds are not typically present in domestic waste.

It is known that waste fluids containing a relatively low level of biodegradable compounds, in the range from 100–1000 ppm, cannot normally be treated either effectively or economically, in a thermophilic process. Surprisingly however, waste fluids may benefit from being treated in an ATAB if they are first converted to a biomass of sufficiently high BOD.

Particular examples of aqueous chemicals waste fluids suitable as feed to an ATAB, are those containing (i) a mixture of synthetic metal-working fluids, fats oils and greases ("FOG") mixed with synthetic organic and organometallic compounds, some of which are insoluble solids, others emulsifiable liquids, and still others soluble solids and liquids; (ii) $C_3$–$C_{26}$ alcohols, fatty acids, alkaryl and aralkyl carboxylic acids and esters thereof, particularly alcohols and lower $C_1$–$C_6$ alkyl esters of fatty acids, or, $C_6$–$C_{13}$ alkyl esters of $C_6$–$C_{13}$ alcohols, or, di($C_6$–$C_{13}$)alkyl phthalic acid esters from a plant making plasticizers; (iii) monocyclic monoolefins such as cyclohexene, monocyclic diolefines such as cyclopentadiene, polycyclic cycloolefins, particularly a mixture of mono- and di-olefinically unsaturated polycyclic olefins, such as norbornene, methyl norbornene, tetracyclododecene, and dicyclo-pentadiene, from a polymer plant; (iv) straight chain $C_8$–$C_{20}$ paraffins from a lubricant plant; (iv) solvents and chemicals used in the electronics industry for making, etching and washing printed circuit boards and microprocessors; etc.

Particular examples of aqueous agricultural waste fluids contain (i) cheese whey from a cheese making plant; (ii) dispersed blood, hair, proteinaceous tissue and fat from meat packing plants; (iii) dispersed particles of grain flour from cereal processing plants; (iv) fermentation broths from ethanol plants; (v) milk and cream from a dairy, or ice cream plant, etc.

Domestic sewage, and waste fluids, when biochemically converted in a conventional activated sludge process, produce a substantial amount of sludge because of the conditions of degradation. The goal of this process is to demonstrate that, in a thermophilic process known to minimize sludge production, an ATA MBR not only nurtures and maintains a high concentration of hot cells which are duly acclimated to their designated task, but also prevents hot cells from being lost. In such a process, if necessary, domestic sewage and many wastewater streams may be biodegraded with the production of essentially no sludge. This is of particular interest under conditions where neither disposal of sludge nor its storage are desirable alternatives, as for example, in urban areas with limited landfill space, or on board a ship or other marine vessel which may carry several hundred persons, or more.

The constituents of a typical feed to the ATA process vary in biodegradability across the full spectrum of difficulty. Most preferably, feeds to be treated contain high levels of biodegradable organic matter, e.g. feeds such as cheese whey.

A typical toxic chemical waste fluid treated in a ATAB contains aromatic and aliphatic and alkylaromatic hydrocarbons, some of which may be halogenated, sulfonated, oxygenated, etc. along with domestic sewage. The waste fluid often has an insignificant ammonia-nitrogen content in the range from 10 ppm to 50 ppm. Such waste fluids contain a minimal amount of refractory (non-biodegradable) matter, and are received as feed for this process directly after the feed components are collected from locations at which they originate, and without any preliminary treatment if it contains an insignificant amount of large solids >180 µm, preferably, substantially none greater than 106 µm.

"Feed" to the ATA reaction zone has a relatively high ultimate BOD>5,000 mg/L, preferably in the range from 10,000 to 250,000 mg/L; and, most preferably from 25,000–100,000 mg/L. Upon treatment in the system, an effluent permeate from the membrane means typically has a COD of <1000 mg/L, and no measurable suspended solids, all of which are filtered out by a microporous or semipermeable membrane.

It will now be evident that, though a typical domestic sewage having a BOD to COD ratio >0.8 g/L may be "feed" for an ATA MBR used by itself ("single stage"), because the feed contains easily biodegradable organic matter, it is uneconomical to supply the heat required to operate the reactor above about 45° C. unless exigent restrictions exist relating to the disposal or storage of sludge.

Acclimated "hot" cells used in the ATA process can degrade at least 90%, and often 100% of the organic matter in the "feed", if the feed is free of refractory compounds and the solids retention time (SRT) and HRT are long enough. In the novel ATA process described herein, the COD is essentially equal to the BOD, because there is so little normally refractory matter; or, what normally is non-biodegradable matter (and is therefore measured only as COD), is now consumed in the ATA process by the hot cells, as nutrients (carbon source). A typical proteinaceous and hydrocarbon "feed" to the ATA process includes hydrocarbons and oxyhydrocarbons with a COD in the range from 10,000–150,000 mg/L.

More specifically, since the primary goal of this process is to convert predominantly recalcitrant contaminants in the feed to products such as carbon dioxide and water by biochemical oxidation, in a single stage bioreactor with a minimal amount of sludge production, the use of any type of adsorbent or separation medium (together referred to as "media") is clearly contraindicated. The goal required the development of a single stage solely biological reaction zone in a more cost-effective process than any currently known; and, to develop a specific process in which an ATA MBR would generate only a minimal amount of sludge to be disposed of, most preferably none. It transpired that such a single stage ATA MBR may be combined with a MP MBR to provide a combination of functions which proves to be unexpectedly effective and economical.

As is well known, a MPB (mesophilic bioreactor, not a MP MBR) which is effective in a conventional suspension process, is wholly incapable of producing minimal sludge if it is to produce a reasonably "clean" effluent, unless it is operated under "extended aeration" condition. Such conditions, except under the most unusual circumstances, are uneconomical. Despite the known efficacy of thermophilic reactors (not a MBR), biomass or activated sludges produced therein do not settle either as easily, or as fast as a conventional mesophilic activated sludge, and such deficient settling properties of thermophilic sludge cannot be successfully dealt with in a conventional clarifier. Therefore, the effluent from a conventional ATAB is treated with acid or base to give the effluent a hydrolytic assist before returning the effluent to the MPB. See *Proceedings*, 40th Annual Purdue Industrial Waste Conference, pp. 775–784 Ann Arbor Press, Ann Arbor, Mich. (1986).

Still further, the received wisdom in the art was that membranes were prone to heavy fouling under continuous usage conditions, and moreover were more susceptible to damage in the temperature range in which an autothermal bioreactor operates. The '765 Budd et al teaching is non-enabling because there is no indication of what particular membranes, composite or not, might prove useful; or, how to avoid fouling of those membranes at a throughput which provides a reasonable yield of permeate; nor is there any indication as to what class (UF, MF or RO), or type (channel, spiral, tubular or hollow fiber), or material (polysulfone, fluoropolymer, etc) of membrane will actually provide a practical separation. Though the relative flow rate of concentrate recycled to the reactor is stated to be 20 times the feed to the reactor, there is no suggestion how to cope with the damage which may be done under inapt process conditions which a too-high back pressure against a composite membrane may separate it from its support. It is essential that permeate pressure never exceed the pressure on the feed, even within the module. In particular, there is no suggestion that a high enough velocity of mixed liquor through the robes of a tubular membrane module might be achieved by controlling the pressure drop through the tubes so as simultaneously to lower the transmembrane pressure and keep the membrane wall from fouling. For this reason, in all the years since the '765 patent issued, those skilled in the art failed to appreciate the potential of either a MF or UF membrane in the service suggested by Budd et al.

Endogenous respiration or auto-oxidation (or "autoxidation") of the mixed liquor is the result of the cells becoming self-consuming to some degree. This occurs in the aerobic treatment of organic waste in an aqueous stream contacted with an ample supply of dissolved oxygen ("DO"), preferably introduced as oxygen-enriched air, or oxygen alone, and in the absence of readily available organic nutrient. By "ample supply" we refer to a DO concentration of at least 1 ppm, preferably from 3 to 10 ppm in a reactor under ambient pressure.

This process requires the controlled autoxidation of mixed liquor such that hot cells are generated no more than 10% faster than they are consumed. Under such conditions there is a reduction in the net rate of sludge production relative to digestion in a conventional MPB.

It is not likely that one skilled in the an can predict the effects of a combination of normally toxic components of a recalcitrant waste fluid on the rate of metabolization of the living cells, particularly to the extent they may be consumed in a thermophilic environment. Nor could one predict at what level of COD such a waste fluid would allow the acclimated cells to generate an autothermal reaction assuming the cells could have a satisfactory uptake of oxygen.

Extended aeration frequently is used to reduce the net production of sludge because increased HRT increases the amount of autoxidation. As one would expect, however, such extended aeration results in an uneconomical increase in the size of tanks to provide the requisite HRT to 24 hr or more. An HRT of 18 hr in a MPB is far more time than needed for BOD assimilation of a typical feed. Larger tanks, the costs of agitation of a large volume of aqueous medium, and, also of aerating the tanks, add up to an uneconomic processing cost/unit volume of feed treated.

The promise of minimizing sludge production, along with several other benefits of a thermophilic biochemical oxidation process, appeared to be negated by the high cost of the equipment necessary and the costs of operating that equipment. To help evaluate the problem, an extensive study of the numerous considerations relating to the evaluation, development and operation of such a system was presented in a paper titled "Autothermal Thermophilic Aerobic Digestion in Federal Republic of Germany", at the 40th Annual Purdue Industrial Waste Conference, Lafayette, Ind. in May 14–16, 1985, and in U.S. Pat. No. 4,246,099 to Gould et al.

Another determinative factor for successful operation of this process, is the preferred operation of the ATA reactor at constant volume. Such operation resulted in specifying the system so as to generate permeate at a critical rate greater than that at which permeate is recycled to the reactor. This high rate of permeate production makes it possible to provide a permeate recycle, if desired, in addition to the recycle of concentrate to the ATAB. Despite the apparent contradiction of recycling the permeate after going to the trouble of generating it, a flow rate of permeate recycle, less than the flow rate of incoming raw feed, is desirable for the reactor to operate at constant volume, and to feed a membranous UF zone at a constant rate of flow. The reason for the permeate recycle is explained in detail herebelow. Alternatively, permeate flow may be continuously controlled to match the in-flow of feed so that there is no recycle of permeate, as explained below.

This process incorporates the foregoing features and relies upon the unique operation, of an ambient pressure, aerobic thermophilic reactor, most preferably in combination with an equalization tank and a membrane device tailored to separate permeate and molecules of predetermined size which are products of biodegradation, from biomass which is recycled.

As will readily be evident, the '840 process relies upon at least the following: the two reactors (one thermophilic, the other mesophilic), a thickening tank, a hydrolyzer tank, and two gravity-settling tanks. A first settling step is the routine removal of heavy solids, easily accomplished in a primary clarifier which removes insoluble organics and grit. The effluent from this clarifier, containing mainly dissolved organic solids, is then biochemically convened to biomass in a conventional activated sludge reactor (referred to in the '840 patent as an "aerobic zone", but referred to in this specification as a "mesophilic aeration zone" since the thermophilic zone is also "aerobic"). The conventional sludge effluent from the '840 aerobic zone is then settled in a secondary clarifier.

What is not stated is that effluent from the ATAD tank 34 would contain duly acclimated cells which would be lost when the effluent 35 is flowed to the aerobic zone 6. The ATAD fails to meet the "essentially no-loss requirement" imposed by conditions of temperature in the upper portion of the range from 40° C.–75° C. Further, if the suspended solids in the ATAD effluent are finely divided, that is, less than 180 μm, it is impractical to thicken the effluent in a settling tank or centrifuge, or other conventional thickening means such as the use of flocculants and thickening chemicals.

A most important feature of the ATAD '840 process is that the treated effluent from the ATAD bioreactor must be further biochemically oxidized in the aerobic zone before the effluent from the latter may be clarified and discharged as purified water. To accomplish this task requires all the equipment identified above, not to mention the many high-service-duty pumps (for high flow rates required), several large tanks and the extensive network of large diameter piping connecting the tanks. Clearly, the '840 patent provides an equivocally effective solution to the problem.

The ATA process of this invention provides a far more effective, unexpectedly simpler and more economic solution, than any proffered in the prior art, provided it (ATA process) is operated within a relatively narrowly defined window of operating criteria. Our process does away with the conventional aerobic reaction zone as well as the hydrolyzer, thickener, primary and secondary clarifiers. An appropriate membrane device, in combination with a single stage ATAB and associated pump and piping means, is all that is basically required if a feed, essentially free of large suspended solids >180 μm and too large to be degraded by the thermophilic cells, is to be treated in a desirable dilution. Feed is diluted to provide enough water to prevent the build-up of salts and non-biodegradable byproducts to toxic or inhibitory levels for the biomass.

It is such a process which was tested with a variety of synthetic dialkyl phthalate esters which simulate those genetically actually present in a plasticizer plant, and for which esters, singly and in combination, the experimental data set forth herein were obtained. No attempt was made to add the corresponding aliphatic alcohols to the ester-contaminated feed which was formulated to simulate the biodegradability of the actual feed to be treated, because it is known that hot cells which can biodegrade the alkaryl esters can easily biodegrade the aliphatic alcohols.

Though each mechanical component in the system is known, the combination used in the single stage ATA process is found to be economically effective only if operated substantially autothermally, as described hereunder to treat delivered feed which contains a very high concentration, at least 1% TSS, of biodegradable organic matter. The ATAB is operated to maintain a predetermined concentration of recalcitrant compounds and more easily degraded organic matter as TSS, and the membrane device is operated as a MF or UF tubular membrane at low pressure, in the range from about 170 to 1035 Kpa (10 psig to 135 psig), preferably under 50 psig (450 kPa). Such operation results in a controlled, high mass flow of solids-containing concentrate as a recycle stream.

The mass flow from the ATAB is surprisingly high, yet (i) for recalcitrant compounds requiring an HRT>24 hr in a MPB, the mass flow provides a long enough SRT to degrade the organic waste in delivered feed, and also (ii) completes biodegradation of the recalcitrant organic matter with a HRT of less than 10 days, and preferably less than 48 hr. The key to providing the foregoing is to use a feed with a high ultimate BOD content, >0.6 times its COD, and to maintain a stable population of living cells at ambient pressure in the ATAB.

SUMMARY OF THE INVENTION

It has been discovered that a wastewater feed containing an ultimate BOD/COD ratio>0.6, is a particularly well-suited "feed" (defined above) for especially acclimated thermophilic and/or caldo-active living microorganisms ("hot cells") which thrive in an autothermal aerobic (ATA) reaction zone having an ATA bioreactor ("ATAB") operating at substantially ambient atmospheric pressure, and operatively coupled with a MF or UF membrane filtration device in a membranous filtration zone; this combination, referred to as an ATA "membrane bioreactor" (ATA MBR), is one in which a feed containing biodegradable organic materials having a BOD of at least 5,000 mg/L, preferably at least 10,000 mg/L (10 g/L) when a minor portion of "municipal" wastewater is present, is degraded to provide an autothermal biodegradation reaction which is self-maintained at or above 40° C., generally in the range from 40° C.–85° C., preferably in the thermophilic range from 45° C.–75° C., and most preferably from 55° C.–75° C.

It has further been discovered that the inherent advantage of a higher flux at higher temperature provides an unexpected enhancement of biokinetics in "hot cells", making it practical to operate an ATA MBR at a desired high COD loading at a lower concentration of TSS than would be possible at a lower temperature. Thus a surprisingly high membrane productivity is obtained relative to a known combination of thermophilic and mesophilic bioreactors (which are not MBRs).

It is therefore a general object of this invention to provide a "hot" ATA MBR as the core of a simple, single stage waste disposal system. The process takes advantage of the unique ability of especially acclimated cells to metabolize not only domestic sewage but also almost any organic material which is not refractory, provided the population of living cells is maintained stable; the process provides optimum membrane flux at the elevated temperature of operation; and, it is flexible enough to operate with a variety of wastewaters. If desired, by operating within a preselected window of operating criteria, one can unexpectedly obtain "zero" sludge production if the contaminants are only recalcitrant, but completely biodegradable; and, the process may be operated with minimal net sludge production, with feeds in a wide range of concentrations, with ultimate BODs in the range from 100–50000 mg/L, preferably from 5000–25000 mg/L, and the recalcitrant contaminants are not completely biodegradable with an HRT of 12 days.

It is therefore a general object of this invention to provide a biochemical oxidation process for convening a feed with a high ultimate BOD content, >0.6 times its COD, to mainly carbon dioxide and water, with a minimal net production of sludge. The ultimate BOD is preferably in the range from 0.75 to 1.0 times its COD, most preferably from 0.8–1.0 times its COD, and when the mixed liquor is aerated with enough oxygen-containing gas for consumption by the cells, at least 5% by weight of the organic material in the feed is convened mainly to carbon dioxide and water during each day of operation. The sludge produced is at least less than 20% of the amount one would expect to make in a conventional activated sludge process with the same feed, with only a mesophilic aerobic zone operating at the same HRT. A membranous filtration zone uses a membrane module tailored to let pass particles and molecules, depending upon the filtration service desired, in the range from about 0.001 μm (micrometer) to 0.1 μm in effective diameter when the module is operated at a pressure in the range from about 170–689 kPa gauge (10–100 psig). As a result, even with a feed having an arbitrarily high TSS content, the TSS of purified water leaving the membranous zone is insensitive to the solids content of a stream of mixed liquor withdrawn from the ATAB and recycled to the ATAB.

It is also a general object of this invention to provide a combination in which an ATAB and MF or UF filtration means, produces a solids-free purified water stream with a COD removal rate in the range from 60–95% or even more, typically from 80–90%, when a feed of a substantially completely biodegradable feed or waste fluid is fed to the reactor. Such a high COD removal rate is obtained even if the source of carbon for the oxidation reaction is provided by compounds deemed to be toxic to normally mesophilic cells; examples of such compounds are certain $C_6$–$C_{13}$ alkyl esters such as ethylbutyrate; and, $C_{13}$–$C_{30}$ alkaryl esters such as 2-ethylhexyl phthalate and dioctylphthalate phthalate present in a waste fluid stream having a BOD in excess of 40,000 mg/L, as long as the membrane bioreactor is operated with cells acclimated for the particular ester(s) being fed, as described below.

It has also been discovered that a combination of an ATA MBR and a MP MBR is unexpectedly effective to minimize sludge generation even in feed having a relatively low concentration of solids in the range from 100–1000 ppm, when the latter functions as an external pretreatment means to convert feed to biomass, and deliver it to the ATAB in a high enough concentration to allow the ATAB to operate substantially autothermally. The function of the ATA MBR is to minimize the volume of sludge generated, efficiently and economically.

It is therefore another general object of this invention to provide a combination of ATA MBR and MPB MBR systems, simultaneously to minimize the cost of operation of the ATA MBR and to minimize the mount of sludge generated.

When the feed contains recalcitrant solids such as difficultly dispersible fecal matter, or, a high concentration of suspended particles of fats, oils and greases ("FOG"); or, refractory solids such as globs of rubber, pieces of wood, and the like, the feed to the reactor is first skimmed in a feed equalization tank to remove free oils, and also settlable solids are allowed to settle and are removed. It is necessary that essentially all, except very finely divided and emulsifiable solids, are removed from feed to the reactor, preferably in a filtration zone equipped with a 106 μm screen. This presettled and preferably prefiltered feed allows the ATAB to be operated with (i) mixed liquor total suspended solids (MLTSS) in the range from 10,000–30,000 mg/L, (ii) high mixed liquor volatile suspended solids (MLVSS), (iii) a HRT of less than 12 days, preferably in from 6 to 10 days, and (iv) a solids retention time (SRT) in the range from about 10 days, to an arbitrarily long time, which is essentially infinite in the particular case when there is no (0%) net sludge production.

It is a specific object of this invention to provide an ATA process comprising, (a) removing easily settlable solids from a high BOD wastewater feed, and feeding a substantially constant flow rate of "feed" $Q_f$ to the reactor at a dilution acceptable to acclimated thermophilic cells; (b) comminuting solids to produce essentially none greater than 180 μm; (c) aerating the feed in the presence of said live cells in an ATA bioreaction zone at a temperature in the range from 45° C. to 65° C., and pressure in the range from 100 kPa to about 150 kPa (abs) while maintaining a substantially constant HRT of at least 12 hr in that zone; (d) withdrawing from the ATAB a predetermined portion of mixed liquor and directing it to a membranous filtration zone so as to generate a rate of flow $Q_{per}$ of permeate from the membrane module greater than $Q_f$; (e) maintaining the solids concentration of a predetermined portion flowing at $Q_f$, within predetermined concentration limits; (f) recycling concentrate from the filtration zone to the ATAB without thickening or hydrolyzing it; (g) recycling a first portion of the permeate at a flow rate $Q_r$, to the ATAB at a rate in the range from 0% to 100% of a flow rate $Q_p$ at which a second portion of permeate is removed from the system; and (h) removing the second portion of permeate at flow rate $Q_p$, as high quality water from the membranous filtration zone.

It is a specific object of this invention to provide an essentially continuous process for treating feed utilizing a MBR system, the process comprising,
(a) providing a pretreatment zone for the feed, the zone having a volume sufficiently large to equalize variations in the flow rate of the feed to the pretreatment zone which is adapted for removal of settlable solids and skimmable free oil, and removing skimmed feed from the zone;
(b) comminuting solids to finely divided solids in the size range from about 90–180 μm to provide a biochemically oxidizable feed free of large difficultly biodegradable solids;
(c) feeding the feed at an essentially constant rate of flow $Q_f$ to an autothermal aerobic bioreaction zone maintained at a temperature in the range from 45° C.–75° C., with an essentially constant volume of liquid therein, and, with a HRT in the range from about 4 days but less than 12 days;
(d) aerating the biochemically oxidizable feed in the presence of live microorganisms acclimated to degrade materials which are held in a mixed liquor suspension within the reactor with a solids retention time (SRT) of at least 1 day, using sufficient oxygen-containing gas to provide the metabolic needs of the microorganisms;
(e) separating permeate from a concentrate containing the solids by flowing the mixed liquor to a membranous filtration zone at a velocity and pressure sufficient to maintain a predetermined membrane flux at which a sufficiently small amount of solids are retained on the surface of a membrane means in the filtration zone, the membrane means having an area sufficiently large to provide a flow rate $Q_{per}$ greater than the combined flow rates $Q_{rw}$ and $Q_d$ of raw waste and dilution water respectively;
(f) flowing the concentrate from the membranous filtration zone into the ATA bioreaction zone as a concentrate recycle;
(g) removing an effluent of acceptable quality; and,
(h) flowing excess permeate, over that removed as effluent, at a rate $Q_r$ back to the bioreactor.

It is yet another specific object to provide a process in which the steps (a) through (g) are the same as those recited immediately hereinabove, but removing all permeate as effluent while modulating the flow of feed to the ATAB.

It is another specific object of this invention to treat a biodegradable wastewater stream having a COD>10000 mg/L in a system comprising an ATA bioreactor and a module containing an UF membrane, to yield an effluent having the following values:

Chemical Oxygen Demand, COD<50 mg/L;

Biological Oxygen Demand, $BOD_5$<25 mg/L;

Total suspended solids, TSS<10 mg/L; and,

Total FOG<25 mg/L.

It is still another specific object of this invention to provide a process comprising,
(a) flowing raw waste feed at a rate $Q_{rw}$, combination with from 0% to about twice as much dilution water as feed, the dilution water being fed at a rate $Q_d$, to an equalizer tank in a pretreatment zone for the raw waste, the zone having a volume sufficiently large to equalize variations in the flow rate of the raw waste to the pretreatment zone which is adapted to remove settlable solids and skimmable free oil, and to withdraw a skimmed feed containing hydrocarbons from the zone;
(b) removing non-dissolvable and non-emulsifiable solids larger than 106 μm from the skimmed feed and introducing it at a substantially constant flow rate $Q_f$ to a bioreaction zone containing acclimated thermophilic living microorganisms in a mixed liquor;
(c) aerating the mixed liquor in the presence of the microorganisms at ambient or low pressure, in the range from about 1–5 atm, while maintaining a temperature in the range from 50° C.–60° C., and substantially constant HRT over an arbitrarily long time, longer than either the liquid residence time or the HRT of the bioreaction zone, based on $Q_f$;
(d) flowing a predetermined portion of mixed liquor from the bioreaction zone to a membranous filtration zone so as to generate a rate of flow of permeate greater than $Q_f$;
(e) maintaining a solids concentration of the predetermined portion within predetermined limits without externally hydrolyzing any portion of the mixed liquor;
(f) recycling a first portion $Q_{p1}$ of the permeate to the bioreaction zone; and,
(g) removing a second portion $Q_{p2}$ of permeate as reusable and sewerable (to city or municipal sewer system) water.

BRIEF DESCRIPTION OF THE DRAWING

The foregoing and additional objects and advantages of the invention will best be understood by reference to the following detailed description, accompanied with a schematic illustration of a preferred embodiment of the invention, in which.

DETAILED DESCRIPTION OF PREFERRED EMBODIMENTS

Figure 1:
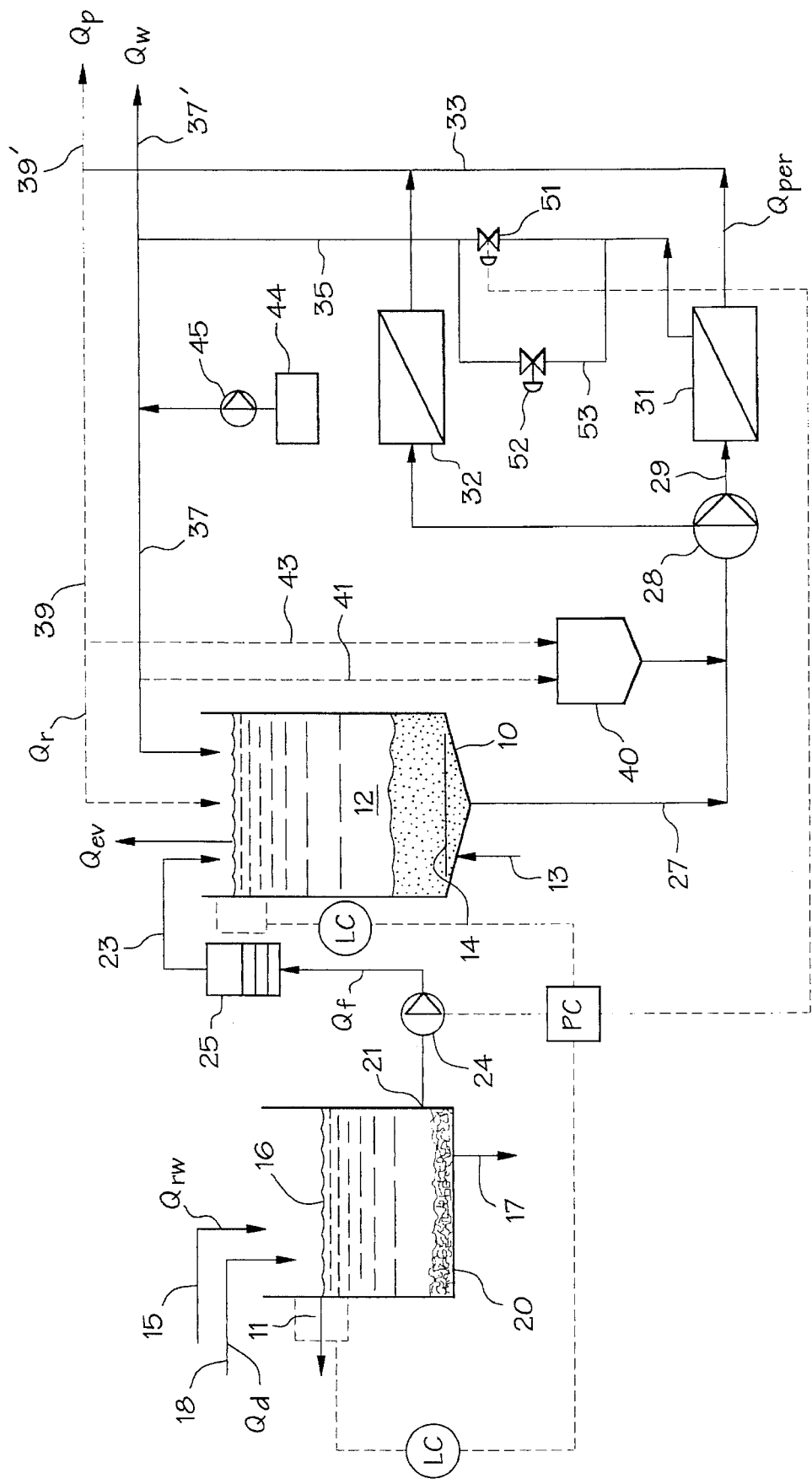
FIG. 1 is a flowsheet of a ATA MBR single stage system schematically showing its operation with a membrane unit having a pair of UF modules, and an optional permeate recycle in a dashed line connoting flow from 0% to about 30% of permeate generated. In addition to a reference numeral identifying components of the system, flow rates for streams are designated, and a simplified schematic for a control system for the permeate and concentrate recycle.

The ATA process may be adapted for use in any environment in which the economics of minimizing sludge production warrants using a "hot" process other than a conventional mesophilic activated sludge process. This "hot" process is not directed to the oxidation of nitrogen compounds, most particularly not to waste fluids which contain sufficient ammonia to be volatilized under the conditions of this ATA process.

In a preferred embodiment, this "hot" system is specifically intended for use by those concerned with the cost of treating wastewater having a high COD content greater than 10,000 mg/L, economically and effectively. At this high COD autothermal operation of a bioreactor at a minimum temperature of 40° C. is achieved. Most preferred operation of the bioreactor is in the thermophilic range from 50° C.–55° C. to achieve a balance between swift acclimation of normally mesophilic cells, and low sludge production. Higher COD loadings will typically allow operation in the range from 60° C.–75° C. and may include preheating of the feed if the economics of doing so are favorable.

Though a typical industrial, chemical or agricultural plant generates waste fluid in a relatively small volume, compared with the volume of domestic wastewater generated by a metropolitan area, the problem of disposing of the small volume with recalcitrant components requires that the waste fluid be disposed of by the operators of the plant. The main reason for this responsibility of the operators is that their waste fluids typically have very high COD contents, often above 10 g/L. Even without recalcitrant components, a municipal sewage disposal facility is unable to treat such waste fluids at an acceptable COD loading if the COD of such waste rises above 1,000 mg/L.

Such typical waste fluid streams which lend themselves to effective treatment in an ATA zone are represented by the discharge of whey from a cheese factory; plasticizers from a chemical plant; wastewater from a meat packing plant; etc.

It will be recognized that, typically, it is of little concern whether a bioreactor operates at essentially constant volume with essentially constant feed, or a variable feed. To maintain constant reactor volume ("V") when flow (volume/time, "Q") of feed varies, the area ("A") of membrane required must be based on minimum flux LMH (L/m$^2$-hr, "F") during a cycle. Thus, in an example, to treat 1000 L/hr ("Q") of feed with a membrane having a minimum flux of 100 LMH, "A" required is 10 m$^2$.

However, "V" of an ATA reactor must be based on maximum flux, since the ATA reactor must contain enough wastewater to be flowed to the membranes when they are operating at maximum flux. Assuming the maximum flux is twice the minimum, that is, 200 LMH, and the minimum HRT required to degrade the waste is 24 hr, then $$V = F \times A \times HRT = 200\ L/m^2\text{-}hr \times 10\ m^2 \times 24\ hr = 48{,}000\ L.$$

With constant feed flow rate in a reactor operating at constant volume, as in this ATA system, the required membrane area is based on minimum flux, as before, and is 10 m$^2$. But the reactor volume is based on minimum flux 100 LMH since feed flow is constant and both concentrate and permeate are recycled, so the volume of the reactor now required for the same HRT of 24 hr is $$V = F \times A \times HRT = 100\ L/m^2\text{-}hr \times 10\ m^2 \times 24\ hr = 24{,}000\ L.$$

Though this is an inherent advantage of the ATA system, the resulting beneficial results are not evident from the prior art. In a commercial system requiring that a feed Q=1000 L/hr be treated, it makes a significant economic difference whether the reactor purchased is twice the volume it could be under different operating conditions.

As stated hereabove, it was found that once the incoming solids are comminuted to a size range smaller than about 106 μ, successful biodegradation of feed to the bioreactor depends upon maintaining a high enough SRT and HRT, and at the same time being able to accommodate normal flux fluctuation during a cycle before cleaning of the membrane, without substantially sacrificing the average flux obtained during the cycle.

In a typical situation, faced with having to do the foregoing, one can either (a) raise the pressure of the stream delivered to the membranes of the number of modules required to provide a desired permeate flow which, at equilibrium operating conditions, is equal to the flow $Q_f$ of feed; or, (b) one can provide a larger number of modules than needed so that one can operate the modules under substantially constant pressure of the incoming stream because the flux of the membranes remains substantially constant.

Though not immediately evident, one finds that increasing the pressure or temperature to maintain the flux across the membranes of a module, soon results in the use of a pressure which is so high as to entail an unacceptably high risk of failure of a membrane unless it is inorganic. Typical inorganic materials include glasses, ceramics, cermets, metals and the like. Ceramic membranes may be made, for example, as described in U.S. Pat. Nos. 4,692,354 to Asaeda et al (class 472/ subclass 244), U.S. Pat. No. 4,562,021 to Alary et al (class 264/subclass 43), and others. Inorganic membranes are preferred for operation at about 70° C. and above.

An organic membrane is typically a polymer, and is preferred, whether isotropic, or anisotropic with a thin layer or "skin" on either the bore side or the shell side of the membrane. Preferred materials for membranes are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly-(ethylene terephthalate), and the like disclosed in U.S. Pat. No. 4,230,463 the disclosure of which is incorporated by reference thereto as if fully set forth herein.

As schematically illustrated in FIG. 1, if the membrane is a "composite membrane" (an organic polymeric film cast on a permeable support), the membrane means is operated at full permeate flow and a portion of that flow is recycled to the reactor. This recycle represents the difference in flow between the maximum flow of permeate and the flow of feed, including dilution water. The reason is to maintain a constant HRT in the bioreactor and to prevent the permeate side of the membrane from building up a back pressure. Because the film is easily separated from the support on which it is cast, by a substantial reverse flow (i.e. from the permeate side to the concentrate side), it is essential that permeate pressure not exceed pressure on the concentrate side by an amount which will deleteriously affect the film of membrane. This condition is conveniently met by allowing the permeate to be generated without resistance. Since this permeate flow exceeds the flow of feed, a portion of the permeate must be recycled to avoid compromising the HRT of the bioreactor.

As schematically illustrated in FIG. 1, if the membrane is isotropic and backwashable, the permeate is modulated by restricting its flow in one of two, first and second, modes. In the first mode, the flow of permeate is held constant by either (i) a proportioning valve, or (ii) a constant flow positive displacement pump. In either case, there results a significant back-pressure on the permeate side of the membrane when the membrane is clean and its flux high; this back pressure decreases as the membrane is fouled. In the second mode, an on/off valve is modulated on a time proportioning basis to provide essentially constant permeate flow.

There are beneficial results from each mode. The membrane means filters only that mount of mixed liquor which is fed to it, thus lengthening the life of the membrane and a productive cycle. By introducing a back-pressure, the transmembrane pressure is lowered or periodically eliminated, allowing the fouling layer formed on the membrane surface to dissipate into the concentrate stream with a resulting decrease in cleaning duty.

The other alternative, namely using much more membrane area than required in the preceding embodiment, results in production of a large a mount of permeate which is greater in mass flow per unit time, than $Q_f$. Since this would result in depletion of the liquid content of the reactor, a portion $Q_{p1}$ of the permeate produced in the modules, preferably a minor thereof, is recycled, the remainder $Q_{p2}$ being withdrawn.

Under steady state conditions, the relationship between microbial growth and substrate removal may be expressed as:

$$\mu = Yk - b \quad (1)$$

where, $\mu$=organism specific growth rate, mass/mass-time,
k=specific substrate utilization rate, mass/mass-time,
Y=organism yield coefficient, mass/mass, and,
b=organism decay coefficient, time$^{-1}$.

In a biological reactor, the organism specific growth rate is equal to the reciprocal of the SRT of the system. Therefore, from equation (1):

$$\mu = 1/SRT = Yk - b = Yn\ k \quad (2)$$

where, $$SRT = \frac{\text{volatile suspended solids (VSS) in the reactor}}{\text{VSS lost in the effluent or intentionally wasted/day}} \quad (2)$$

and,

Yn=net organism yield coefficient.

Since the VSS lost in the effluent is negligible and solids are wasted directly from the reactor, the system SRT may be expressed as $$SRT = V/W \quad (3)$$

where,

V=reactor volume, m$^3$ and,

W=reactor volume wastage rate, m$^3$/hr.

The SRT is controlled by wasting a predetermined volume of the contents of the reactor, per day.

After establishing the SRT deemed necessary to achieve a given effluent quality, along with values for Y and b, or Yn, k can be determined by respirometry. With k known, the required reactor volume can be determined from values for the reactor VSS and feed and effluent concentration values. The SRT and HRT of an optimal reactor depends on the molecular size of the wastewater components and reaction products, the biological and chemical treatability characteristics of the wastewater components, the inhibitory nature of the reaction products, and the membrane characteristics with respect to effective pore size.

Once a minimum membrane flux is specified, the corresponding membrane area (A) can be calculated as:

$$A = Q/J \quad (4)$$

where,

A=total membrane area required, m$^2$ and,

J=membrane flux, m$^3$/m$^2$-day.

J depends on such factors as the reactor TSS, surface velocity, temperature, transmembrane pressure differential, surface fouling and the extent of concentration polarization. Concentration polarization arises from the accumulation of solutes on the membrane surface. Solutes reach the membrane surface by convective transport of the solvent, a portion of which passes through the membrane. The rejected solutes often form a viscous gel layer on the membrane. This gel layer acts as a secondary membrane reducing the flux and often reducing the passage of low molecular weight solutes. Surface fouling is the result of the deposition of submicron particles on the surface as well as the accumulation of smaller solutes due to such processes as crystallization and precipitation. It is this deterioration in membrane flux which is counteracted by using a larger membrane area than is necessary.

Referring to FIG. 1 there is shown a bioreactor 10 which contains mixed liquor 12 which is an aqueous suspension of very finely divided solids and live hot cells which have been especially acclimated to ingest and degrade the recalcitrant components of a waste fluid as nutrient, optionally with the deliberate addition of other "added" nutrients such as phosphate and nitrogenous compounds. The dots in the drawing emphasize that it is impractical to settle the cells and suspended solids, homogeneously distributed in the volume of mixed liquor by a large quantity of air, preferably enriched with pure oxygen; or to thicken the mixed liquor. The nutrient value of the waste fluids is typically so poor as to require continuous addition of the added nutrients to help the microorganisms ingest the waste fluids. Such hot cells which thrive at a temperature as high as 85° C. are commercially available, or soon will be. The bioreactor operates at atmospheric pressure; it is provided with a sparger 14 through which air, preferably enriched with oxygen, or pure oxygen is distributed from conduit 13 uniformly throughout the mixed liquor to maintain the hot cells. The reactor 10 typically includes baffle means (not shown) to improve contacting the waste fluids with the microorganisms.

Delivered feed is introduced through line 15 into a feed equalization tank 20 which, in addition to equalizing the flow to the reactor, also serves as a settling tank for the removal of settled solids, shown as a sludge in the bottom, through line 17, and the removal of free fats or oil, if present, through line 11. Generally, dilution water 18 is added to the feed in the tank 20 to provide the COD loading desired by the hot cells for the particular contaminant being biodegraded. Free oil and grease "skim" 16 float to the surface and are skimmed off. Depending upon the level of solids in the delivered feed, solids 17 settle and are either periodically or continuously removed from the bottom of the settling tank, and disposed of. Feed is withdrawn from above settled solids in the settling tank 20, through line 21 before it is led to the suction side of a feed pump 24 which operates at low pressure below 100 psig (800 kPa), to pump the aqueous suspension of equalized wastewater through about a 106 μm filtration unit 26. The filtered skimmed feed is then led through conduit 23 into the bioreactor 10.

To maintain constant loading so as to obtain constant optimum biokinetics, feed to the bioreactor 10 is maintained essentially constant so as to maintain (i) a predetermined concentration of solids in the mixed liquor 12, and (ii) a desired liquid level in the bioreactor.

A stream of mixed liquor 12 is withdrawn through pump suction line 27 and discharged as a pressurized stream by pressurization pump 28 through a discharge line 29 to a membrane filtration unit shown in the diagram as a pair of filtration modules 31 and 32 referred to together herein, for convenience and clarity, as membrane unit 30, though it is not shown as such.

It is preferred, in a commercial unit, to use a membrane filtration unit having two or more UF modules 31 and 32 connected in parallel, in each of which one membrane is a MF membrane has a pore size smaller than 0.5 μm, and to maintain operation of the membrane units with a clean water flux (measured at 20° C. and 40 psig or 370 kPa abs) of at least 10 m³/m²/day (41.7 liters/m²/hr or LMH).

Permeate from the membrane unit 30 is removed from the system through permeate recycle conduit 33, while concentrate leaves through concentrate recycle conduit 35. The outlet pressure of the concentrate in line 29 is in the range from about 105 kPa (0.5 psig) to about 308 kPa (30 psig) depending upon the configuration of the modules and layout of the membrane units.

A major portion, preferably more than 95% by volume, of the concentrate stream flowing through conduit 35 is recycled as a recycle stream through 37 and the remainder purged through purge line 37'. A minor portion, preferably from about 0% to <50% by volume, of the permeate stream flowing through conduit 33 is recycled as permeate recycle stream through 39 and the remaining major portion withdrawn as treated effluent through effluent line 39'. The volume of effluent permeate removed through line 39' will depend upon the physical characteristics of the mixed liquor as well as the specifications of the membrane. Typically the effluent stream 33 will range from about 0.5% by volume or even less, to about 3% by volume of the pressurized bioreactor contents stream 29. The portion 39 of the permeate recycled to the bioreactor maintains a balance between incoming feed to the membrane device and removed effluent.

As shown in FIG. 1, level controllers LC are provided on the equalization tank and the ATAB. The LCs in cooperation with a pressure controller PC and control valve 51, which is responsive to the pressure controller PC, maintain essentially constant flow to the ATAB, and a constant HRT. A manual control valve 52 is provided on the bypass line 53, bypassing control valve 51. The manual control valve 52 is set to provide a normal back pressure on the membrane, and yield a desirable flux. When the flux is high, as when the membranes are not fouled, the control valve 51 is opened to decrease the back pressure, increase the flow through the membrane module, and decrease the flux while the flow rate of feed to the ATAB is increased. When the membrane is fouled, the back pressure is increased to increase the flux, and the flow of feed to the ATAB is decreased. Other control systems may be used to effect the same result, provided that each ensures that the back pressure against the membrane will not be suddenly decreased sufficiently to separate the membrane from the inner wall of its tubular support.

If desired, a portion of the recycle streams 37 and 39 may be diverted to a cleaning tank 40 through conduits 41 and 43 respectively, and used to wash and chemically clean the membranes when required. One or more chemicals addition tanks 44 are provided to supply acid and alkali for pH control, and various nutrients, for example phosphate, to supplement the nutrients provided to the biomass by the waste fluids. Pump(s) 45 meter the appropriate chemical(s) when desired.

A membranous filtration unit preferably has a MF module with a nominal pore size in the range from about 0.2 μm to about 0.5 μm; or, a UF module with a nominal pore size in the range from about 0.01 μm to about 0.1 μm. A membrane with pores in the nominal range from 0.1 μm–0.2 μm may be regarded as either a very small MF or a large UF membrane. The choice of membrane used depends mainly upon the quality of effluent which is deemed to be acceptable.

Preferred MF membranes are derived from poly(vinyl alcohol), polysulfone, polypropylene, nylon and the like, for example Zenon SJ. The same materials may be used to provide UF membranes, for example a Zenon TAM membrane.

Referring further to FIG. 1, the flow rates for various process streams are designated as follows:

$Q_{rw}$ = raw waste;   $Q_d$ = dilution water;
$Q_f$ = diluted waste flow;   $Q_{ev}$ = evaporation loss;
$Q_r$ = permeate returned to the reactor;   $Q_w$ = sludge wasting;
$Q_{per}$ = permeate leaving membrane unit; and,
$Q_p$ = permeate leaving the process.

A mass balance around the feed equalization tank requires that the flow rate of diluted waste be equal to the sum of the rates of flow of raw waste water and dilution water, i.e.

$$Q_f = Q_{rw} + Q_d \tag{5}$$

Because the flow of permeate from the membrane unit is in excess of the diluted waste flow, with from 0 to<50% of the permeate being recycled to the reactor, that is, $Q_r < 0.5 Q_{per}$, the permeate flow leaving the process is represented as $$Q_p = Q_{per} - Q_r \tag{6}$$

Taking the loss due to evaporation into consideration, the mass balance around the ATA unit is represented as follows:

$$Q_f = Q_p + Q_{ev} + Q_w \tag{7}$$

When no sludge is wasted, $Q_w = 0$; and the loss due to evaporation is in the range from 0.5 to 3 ml/min depending upon how much air is used to aerate the biomass, and the temperature at which the biomass is retained.

The COD loading is calculated with the equation:

$$COD\ loading = (Q_f)(COD_f)/V \tag{8}$$

where V=reactor volume (15 L in the experimental runs).

Modules were operated for over a year without having to be replaced. For the specific membrane modules tested, the flux varied over more than a two-fold range from about 16 LMH to 42 LMH. It is this large variation in flux which is accommodated by the permeate recycle, allowing the reactor to operate at essentially constant volume, with an essentially constant rate of feed, and having an essentially constant rate of suspended solids withdrawn from the reactor and flowed to the membrane modules. The desired output of high quality effluent could thus be maintained.

Figure 2:
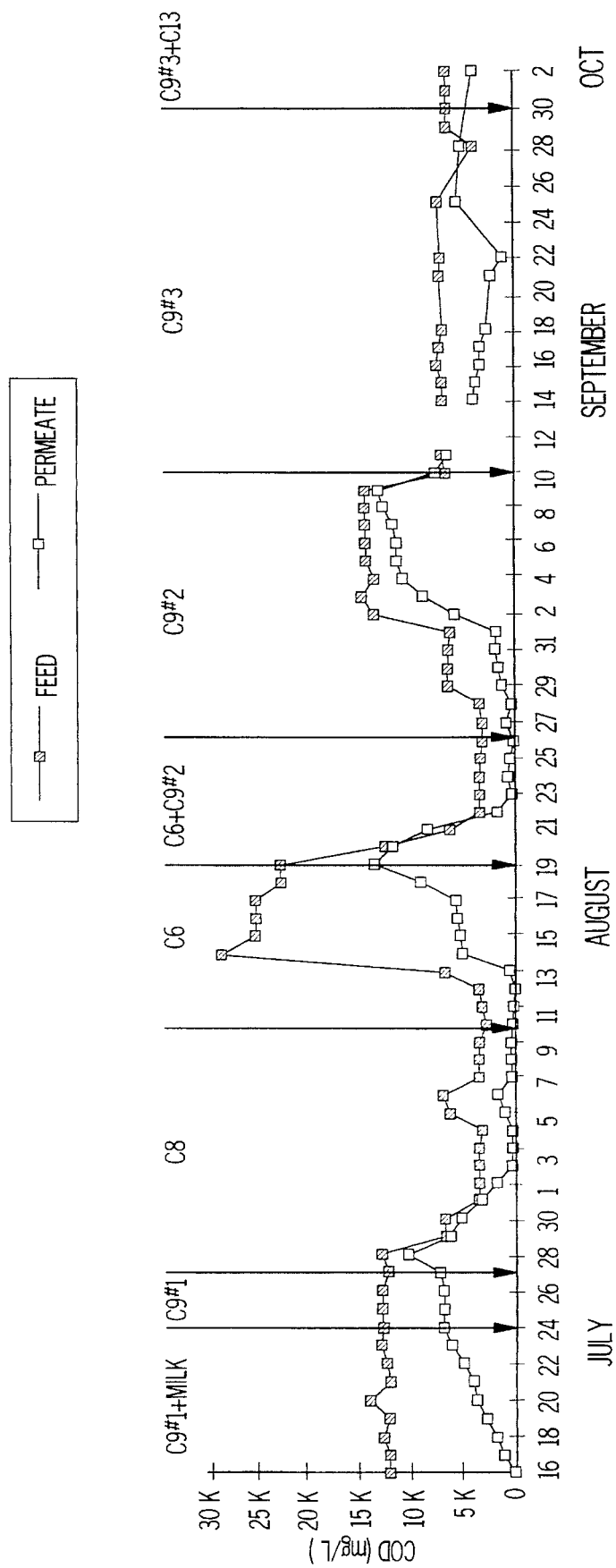
FIG. 2 shows a graph plotting the feed COD (mg/L) and permeate COD with different feed formulations introduced into the reactor on the dates designated.

Referring to FIG. 2 there is shown a graph plotting COD (mg/L) during operation of a reactor operating with 15 L of mixed liquor, at ambient pressure, and maintained with a total suspended solids (TSS) content of about 10 g/L, pH of 7, and at a temperature of 55° C., to test the sensitivity of the pre-acclimated hot cells to the toxicity of different esters. Particular esters were used because the results were to be applied to a waste fluid stream from an ester making plant which waste fluid stream contained a mixture of the esters. Each recalcitrant ester was fed at varying COD (mg/L) levels (shown by locations with black squares) over a period of about two weeks, and the COD of the permeate recovered (shown by locations with white squares) at each feed concentration. The levels were chosen based on a reasonable expectation of the concentration of the esters over a period of one year.

Referring further to FIG. 2, it is seen that feed with dioctyl phthalate was fed at about 13000 mg/L (seen as solid black squares), initially with added milk, to facilitate acclimation of the cells, and after a week the COD of permeate levels off at about 6500 mg/L. After two weeks, the dinonyl phthalate is replaced with dioctyl phthalate at a reduced loading, between about 5000 mg/L and 7500 mg/L. It is seen that when the loading is about 4500 mg/L the COD level in the permeate is essentially zero. About the middle of August, dihexyl phthalate was substituted for the dioctyl phthalate. As the COD of the feed was raised, the COD of the permeate increased. Subsequently, when dinonyl phthalate was substituted for the dihexyl phthalate, it is again evident that at COD greater than about 5000 mg/L, the COD of the permeate is not zero. Despite the restriction on loading if COD of the permeate is to be essentially zero, it should be noted that, from experience, it is known that at comparable HRT, a MP MBR has no significant effect on reduction of COD in the permeate.

Figure 3:
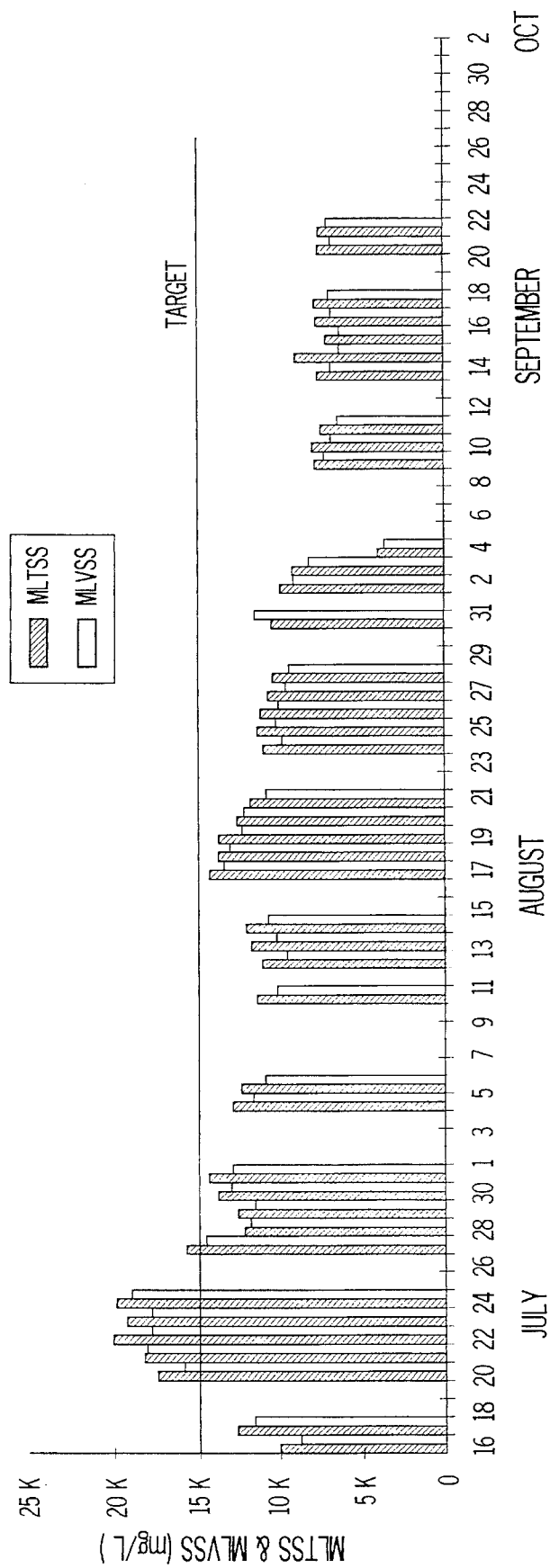
FIG. 3 is a bar graph showing the relationship between the mixed liquor total suspended solids (MLTSS in solid bars), and, mixed liquor volatile suspended solids (MLVSS in white bars) for a feed in which each is about 15000 mg/L. Because both, the MLTSS and the MLVSS remain about equal, no net generation of sludge is indicated.

Referring now to FIG. 3 showing a bar graph wherein mixed liquor total suspended solids (MLTSS in solid bars), and, mixed liquor volatile suspended solids (MLVSS in white bars) are shown for a feed in which each is about 15000 mg/L, a net production of zero sludge would have all bars at the target level, indicating no build up of either. However, with the feed solids being varied (decreased, so as not to overload the reactor), it is seen that both the MLTSS and the MLVSS remain about equal to one another, indicating no net generation of sludge.

In the foregoing tests the reactor was operated at a HRT in the range from about 7 to 10 days, and the SRT was infinite because there was no sludge to be disposed of.

The bacteria found to be effective in the process are acclimated strains which were developed from inocula taken from soil fringing holding ponds in which the waste fluid was stored. Though not particularly identified herein as such identification is not immediately relevant to the ATA process, it is expected that the strains which perform the bulk of the bio-stabilization were derived from cells commonly found in activated sludge and include the genera Pseudomonas, Zooglea, Achromobacter, Flavobacter, Nocardia, Bdellovibrio, and Mycobacter, normally all considered heterotrophic. Some autotrophic bacteria which may also be present are represented by Nitrosonomas and Nitrobacter, both nitrogen fixing. Also found in activated sludge are a variety of fungus, yeasts and protozoa, some of which may also be useful in the ATA process.

In the pilot plant operation, mixed liquor from the bioreactor containing a mean volume of 15 L mixed liquor, is flowed to a single tube 10 mm diam. membrane unit equipped with a commercially available ADC membrane. The unit contained eight (8) tubes, each 1.83 m long and 2.22 cm in diameter, connected in series to provide a membrane area of 0.975 m². The unit was connected to recycle concentrate to the bioreactor, without any provision for bleeding off sludge as waste because the goal was to run the reactor without having any sludge to be disposed of, other than by biodegradation. A portion of the permeate was recycled to the ATAB, and the remainder was removed as effluent. A liquid level control system maintains the reactor volume within about 10 percent of the mean volume of mixed liquor in the ATAB. Enough molecular oxygen from an oxygen tank was introduced into the reactor to provide complete mixing and aerobic conditions for growth of the biomass.

The daily mean dissolved oxygen (DO) concentration in the reactor was in the range from 0.5 to 6.1 mg/L. The reactor pH ranged from 6.8 to 7.2. The ratio of concentrate recycle $Q_c$ to permeate flow $Q_p$ is maintained at about 120 or<1% permeate. The concentration of solids in the concentrate recycle line is essentially the same as that in the bioreactor.

Figure 4:
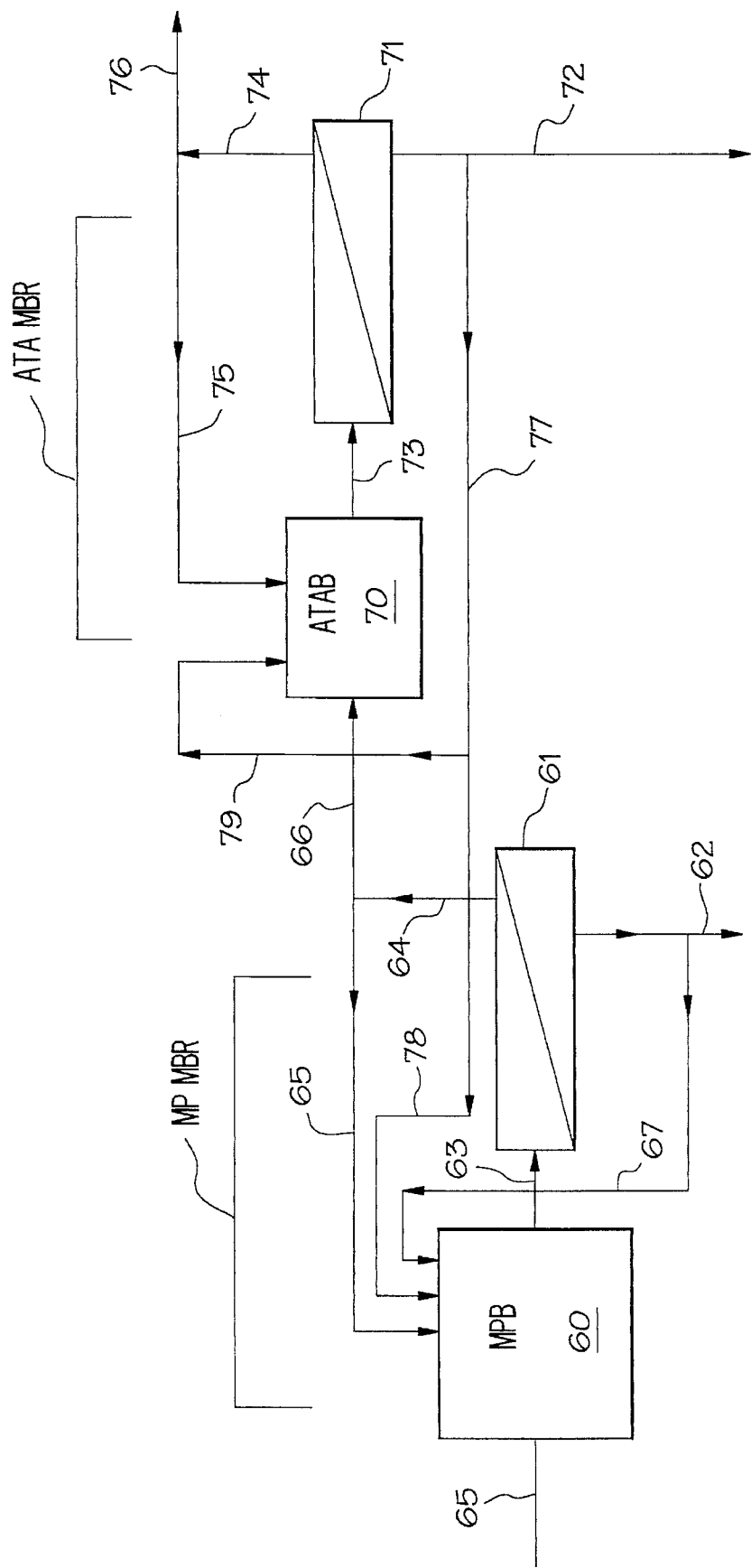
FIG. 4 is a flow diagram schematically illustrating the two-stage system in which a MP MBR is used to convert feed to sludge having a high enough BOD to maintain a substantially autothermal reaction in the ATAB to which a portion of the sludge is fed. No sludge is discharged from the MP MBR, and all the mixed liquor from the MPB is recycled to it after filtration in its membrane unit.

Referring to FIG. 4 there is shown a simplified flowchart for a two-stage process for operating a first stage MP MBR to biodegrade relatively easily degraded materials and produce a mixed liquor with a high enough COD to operate a second stage ATA MBR. The first stage comprises the combination of MPB 60 and its membrane module 61, forming the MP MBR; the second stage comprises ATAB 70 and module 71, forming the/ATA MBR. In practice, it will be appreciated that each stage comprises substantially the same equipment as shown in greater detail in FIG. 1, except that in the first stage the reactor is a MPB 60 and in the second stage it is an ATAB 70, and the feed 65 is flowed only to the first stage, while effluent permeate is discharged from both membrane units 61 and 71 through conduits 62 and 72 respectively. Mixed liquor from the MPB 60 is pumped through conduit 63 to module 61 and the concentrate flowing out through 64 divided so that a major portion is recycled through conduit 65 to the MPB, the remainder being flowed to the ATAB 70 through 66. The MPB 60 is operated to produce a mixed liquor having a COD of at least 10,000 mg/L if the organic content of the feed is not mainly recalcitrant. Mixed liquor from the ATAB 70 is pumped through conduit 73 to module 71 and the concentrate flowing out through 74 divided so that a major portion, preferably from 90% to 100%, is recycled through conduit 75 to the ATAB. Most preferably only refractive and highly recalcitrant compounds are purged from conduit 76. As before, preferably only a minor portion, from 0 to<50% of the permeate produced in 61 and 71, is recycled through 67 and 77 to the MPB and ATAB respectively, and for flexibility to control operation, all or a portion of the permeate recycle from the ATAB may be diverted to the MPB. This distribution of permeate from 77 through 78 and 79 to the MPB and ATAB, respectively, is shown in FIG. 4. Further, each reactor is desirably provided with an equalization tank, cleaning tank, chemicals tank, pumps, instrumentation and flow control means, etc.

Membrane-Bioreactor System Start-Up

The reactor containing some easily biodegradable vegetable matter, about 1000 ppm of octylacetate and a small amount of other nutrients (nitrogen, phosphorus, potassium) if required, to support biomass growth, is brought up to 40° C. and seeded with the acclimated biomass. Dilution water is added as needed to maintain the desired COD loading. Flow of oxygen was adjusted to maintain a minimum concentration of dissolved oxygen. The reactor pH was maintained near neutral by addition of sulfuric acid. Automatic pH control is maintained with a set point of 7.0. Over a period of several days, the temperature of the bioreactor is gradually raised to 55° C. and the amount of the vegetable matter in the feed was decreased while the alkyl ester was supplemented with an alkarylester, specifically dioctylphthalate.

In several pilot plant run made with representative simulated ester waste fluid streams, the bioreactor was operated with an infinite SRT (days) and with HRT in the range from 5 to 10 days. The performance of the system was assessed by sampling at regular intervals and analyzing for particulate and soluble components. Analyses for $NH_3$-N, total Kjeldahl nitrogen (TKN), and total phosphorus (TP) were less frequent than the analyses for other analytical parameters.

From tests run with several alkaryl esters, the following operating conditions provide the best mode for practicing the ATA process with a thermophilic bioreactor:

| | |
|---|---|
| Feed COD | 76 g/L |
| Feed flow to reactor | 55 gal/min |
| COD loading | 10 kg/m³/day |
| Total suspended solids | 10 gm/L |
| Reactor volume | 2280 m³ |
| Equalization tank volume | 2280 m³ |
| Hydraulic retention time | 7.6 days |
| Temperature | 55° C. |
| pH | 7 |
| Solids retention time | 50 days to ∞ |
| Ultrafiltration flux | 40 LMH |
| Z-8 UF module | 236 m² |

Comparison With the Rozich Process—U.S. Pat. No. 4,915,840

The comparison can only be made for domestic sewage because the HRT range for Rozich's system restricts itself to low concentration/high flow, easily converted feed. In the process of this invention the use of low COD (225 ppm or mg/L) cannot provide an autothermal reaction, and the single stage ATAB can only be operated with heat from an external source. Notwithstanding, if operated at the same feed flow rate as in the '840 example (Table 2), same amount of solids is destroyed but with much less expense (smaller reactor, less equipment) because the HRT required is much smaller. If operated at the same HRT (8 hr) and SRT (18 hr) as the '840 process, the single stage ATAB is four times the size required and provides no greater destruction of solids.

Further, the unexpectedly high flux obtained with the ATA MBR provides economic operation; e.g for COD loading of 10 kg/m³/reactor/day, using a ADC membrane at 30° C. for a MP reactor operating at 20,000 mg/L TSS, flux is enhanced 66% for operation at 50° C. and 15,000 mg/L TSS.

To appreciate the advantages of the ATA process over the prior art '840 process without hydrolysis, a comparison is made which shows that operating each system with the same feed and same SRT of 18 days, to obtain the same destruction of biomass, the '840 system requires a HRT of 8 hr, while the single stage process of this invention requires a HRT of 2 hr. This shows that the same effect is obtained with an ATAB less than one-fourth the mesophilic reactor alone in the '840 process, and with much less than the combined volumes of the mesophilic and autothermal reactors.

In making the comparison, the same yield of 0.25 mg biomass/mg $BOD_5$ for the ATAD is used for the ATAB. There is no basis for applying the yield of 0.5 mg biomass/mg $BOD_5$, given for the MPB in Example 1 of the '840 process, to an ATAD or ATAB. The same VSS decay coefficient of 0.1 per day, and the same feed data (used in the '840 process) including NVSS (non-volatile solids), are also used. These data are set forth below:

| | |
|---|---|
| Feed flow | 10 million gal/day (U.S.) |
| Feed TSS | 220 mg/L |
| Feed VSS | 154 mg/L |

-continued

| | |
|---|---|
| Feed BOD | 220 mg/L |
| Feed NVSS | 66 mg/L |
| Soluble feed BOD | 66 mg/L |
| Total feed BOD | 18317 lb/day |
| Total feed VSS | 12822 lb/day |
| Total soluble feed BOD | 5495 lb/day |
| VSS from BOD conversion | 1374 lb/day |

From the foregoing the calculated HRT for the single stage ATAB is 0.083 days (2 hr). Since the overall HRT for the combined reactors in '840 is 8 hr, the ATAB needs be only one-fourth the volume of the combined volume of the two reactors, or 0.83 million gal (US). The following data are calculated for the ATAB (0.083 million gal), which data are provided by the combination of the MPB and the ATAD in the '840 process:

| | | | | |
|---|---|---|---|---|
| NVSS | 98913 lb | or | 14256 | mg/L |
| VSS | 4969 lb | or | 716 | mg/L |
| TSS | 103881 lb | or | 14972 | mg/L |
| TSS wasted | 5771 lb/day | | | |
| NVSS wasted | 5495 lb/day | | | |
| VSS wasted | 276 lb/day | | | |
| VSS destroyed | 12546 lb/day | | | |

Note that the ATA MBR destroys less VSS than the '840 process because there is less BOD conversion in the former.

Having thus provided a general discussion, and specific illustrations of the best mode of operating a substantially ATA MBR, optionally in combination with a MP MBR, to minimize the amount of sludge to be disposed of from the ATA MBR, and providing specific illustrative processes for this pupose, it is to be understood that no undue restrictions are to be imposed by reason of the specific embodiments illustrated and discussed, and particularly that the invention is not restricted to a slavish adherence to the details set forth herein.

We claim:

1. A single stage process for continuously biodegrading biochemically oxidizable organic material in a feed comprising dissolved and suspended solids in a wastewater mixture, said process comprising;
(a) flowing said feed at a controlled rate of flow to an autothermal aerobic bioreaction zone to provide an essentially constant hydraulic retention time (HRT) in a substantially autothermal bioreactor operating at substantially ambient pressure, said feed having suspended solids smaller than about 180 μm in nominal diameter, an ultimate BOD of at least 5000 mg/liter, and a BOD/COD ratio>0.6;
(b) forming a mixed liquor aqueous suspension of living thermophilic or caldo-active microorganisms ("cells") and said suspended solids which said cells are adapted to degrade at a temperature in the range from about 45° C. to 85° C.;
(c) maintaining an operating temperature within said range to maintain a predetermined stable population of said living cells, wherein said stable population is maintained with a regeneration rate no more than 10% greater than the rate at which said cells are consumed, and said cells are consumed at a death rate no more than 10% greater than the rate at which they are regenerated;
(d) aerating said suspension in said autothermal bioreactor with enough oxygen-containing gas for utilization by said cells to maintain said regeneration rate while converting said organic material mainly to carbon dioxide and water;

(e) flowing said mixed liquor through a microfiltration or ultrafiltration membranous filtration zone at a velocity and pressure sufficient to maintain a predetermined membrane flux in said filtration zone, at which flux is maintained substantially constant, said membranes having a membrane area sufficiently large to provide a permeate flowing from said filtration zone, at a rate chosen to provide said HRT;

(f) flowing concentrate from said membranous filtration zone into said autothermal bioreactor as a concentrate recycle without thickening or hydrolyzing a portion of said concentrate;

(g) controlling the flow of said feed to said autothermal bioreactor to provide said controlled rate of flow sufficient to concurrently provide (1) sufficient nutrients to maintain a preselected growth rate of said cells in said stable population, and (2) enough feed in said autothermal bioreactor to equal in volume the amount of permeate removed; and, (h) periodically removing a minor proportion, from 0 to 10% by volume of said concentrate recycle to modulate solids content in said bioreaction zone yet maintaining said stable population in said mixed liquor, said minor proportion being less than 10% by volume of said biochemically oxidizable material in said mixed liquor; whereby, sludge to be disposed of outside said process is less than 20% by weight of the amount one would expect to dispose of in a conventional activated sludge process with the same feed, operating with a mesophilic aerobic bioreactor at a HRT of less than 24 hr.

2. The process of claim 1, including withdrawing said permeate having acceptable water quality from said filtration zone, at a rate greater than that at which permeate is recycled to said autothermal bioreactor, said membranes are composite membranes on a support; said suspended solids are smaller than 106 µm, at least 10% of the COD loading of said reactor is provided by relatively easily biodegraded organic material; and, said BOD of said feed is at least 10,000 mg/liter.

3. The process of claim 2 wherein permeate recycled to said bioreaction zone is 0% of said permeate withdrawn from said filtration zone.

4. The process of claim 2 wherein permeate recycled to said bioreaction zone is in the range from 0.1% but less than 50% of said permeate withdrawn from said filtration zone.

5. The process of claim 2 wherein said composite membranes are microfiltration membranes and back pressure on said membrane insufficient to separate a microfiltration membrane from its support.

6. The process of claim 2 wherein said composite membranes are ultrafiltration membranes and back pressure on said membrane is insufficient to separate an ultrafiltration membranae from its support.

7. The process of claim 2 including aerating said suspension at a rate sufficient to convert at least 5% by weight of said organic material per day to carbon dioxide and water.

8. The process of claim 2 wherein said BOD in said feed is provided by said organic material selected from the group consisting of (i) a mixture of synthetic metal-working fluids, fats oils and greases mixed with synthetic organic and organometallic compounds; (ii) $C_3$–$C_{26}$ alcohols, fatty acids, alkaryl and aralkyl carboxylic acids and esters thereof; (iii) monocyclic monoolefins, monocyclic diolefines, (iv) straight chain $C_8$–$C_{20}$ paraffins; and, (iv) cleaning solvents and chemicals for electronic components.

9. A single stage process for continuously biodegrading biochemically oxidizable organic material in a feed comprising dissolved and suspended solids in a wastewater mixture, said process comprising;

(a) flowing raw waste feed at a rate $Q_{rw}$, in combination with from 0% to 200% as much dilution water as feed, the dilution water being fed at a rate $Q_d$, to an equalizer tank in a pretreatment zone for the raw waste, the zone having a volume sufficiently large to equalize variations in the flow rate of the raw waste to the pretreatment zone which is adapted to remove settlable solids and skimmable free oil, and to withdraw a skimmed feed containing hydrocarbons from the zone;

(b) removing non-dissolvable and non-emulsifiable solids larger than 106 µm from the skimmed feed and introducing it at a substantially constant flow rate $Q_f$ to a bioreaction zone containing acclimated thermophilic living microorganisms in a mixed liquor;

(c) aerating the mixed liquor in the presence of the microorganisms at ambient or low pressure, in the range from about 1–5 atm, while maintaining a temperature in the range from 50° C.–60° C., and substantially constant HRT over an arbitrarily long time, longer than either the liquid residence time or the HRT of the bioreaction zone, based on $Q_f$ in the presence of a stable cell population maintained with a regeneration rate no more than 10% greater than the rate at which cells are consumed, and said cells are consumed at a death rate no more than 10% greater than the rate at which they are regenerated;

(d) flowing a predetermined portion of mixed liquor from the bioreaction zone to a membranous filtration zone so as to generate a rate of flow of permeate greater than $Q_f$;

(e) maintaining a solids concentration of the predetermined portion within predetermined limits without externally hydrolyzing any portion of the mixed liquor;

(f) recycling a first portion $Q_{p1}$ of the permeate to the bioreaction zone; and, (g) removing a second portion $Q_{p2}$ of permeate as reusable and sewerable (to city or municipal sewer system) water; whereby, sludge to be disposed of outside said process is less than 20% by weight of the amount one would expect to dispose of in a conventional activated sludge process with the same feed, operating with a mesophilic aerobic bioreactor at a HRT of less than 24 hr.

10. A two stage process for continuously biodegrading biochemically oxidizable organic material in a feed comprising dissolved and suspended solids in a wastewater mixture, said process comprising;

(a) flowing said feed at a controlled rate of flow into a substantially mesophilic aerobic reaction zone in a first stage, to provide an essentially constant hydraulic retention time therein, less than 24 hr ("HRT24"), said first stage including a mesophilic aerobic bioreactor (MPB) and a cool mesophilic microfiltration or ultra-filtration membranous filtration zone, and said MPB operates at a temperature in a range from 10° C.–30° C. and ambient pressure with cool mixed liquor having volatile suspended solids (VSS) in the range from 100–25,000 mg/L, said feed having suspended solids smaller than about 180 µm in nominal diameter, an ultimate BOD of at least 100 mg/L and a BOD/COD ratio >0.6;

(b) flowing a mesophilic concentrate obtained from said cool filtration zone, to an autothermal aerobic reaction zone of a second stage which includes an autothermal aerobic bioreactor (ATAB) and an elevated temperature ("hot") membranous filtration zone;

(c) maintaining an operating temperature of said MPB within said cool range, to regenerate said cells at a regeneration rate greater than their death-rate so as to have a net production of biomass;

(d) aerating said suspension in said MPB with enough oxygen-containing gas for utilization by said cells to maintain said regeneration rate;

(e) flowing said cool mixed liquor through said cool filtration zone at a velocity and pressure sufficient to maintain a predetermined membrane flux in said cool filtration zone, at which flux essentially no solids are retained on the surface of membranes in said cool filtration zone, said membranes having a membrane area sufficiently large to provide a permeate flowing from said cool filtration zone, at a rate chosen to provide said HRT;

(f) recycling a major proportion of mesophilic concentrate from said cool filtration zone to said MPB as cool concentrate, and flowing a minor portion thereof to said ATAB;

(g) controlling the flow of said feed to said MPB to provide said controlled rate of flow sufficient to concurrently provide (1) sufficient nutrients to maintain a preselected growth rate of said cells to provide said net production, and (2) enough feed in said mesophilic reaction zone to equal in volume the mount of permeate removed from said first stage; and, in said second stage, (h) flowing said cool concentrate feed at a controlled rate of flow into said ATAB operating at substantially ambient pressure and at a temperature in a hot range from about 45° C. to 85° C., With living thermophilic or caldo-active micro-organisms ("hot cells") and suspended solids which said hot cells are adapted to degrade in hot mixed liquor, so as to provide an essentially constant HRT ("HRTA") in the range from 1–12 days, in said ATAB;

(i) maintaining an operating temperature within said hot range to maintain a predetermined stable population of living cells in said hot mixed liquor, said suspended solids therein having a BOD of at least 20,000 mg/liter;

(j) aerating said hot mixed liquor with enough oxigen-containing gas to maintain said stable population;

(k) flowing said hot mixed liquor through said hot filtration zone at a velocity and pressure sufficient to maintain a predetermined membrane flux therein, at which flux essentially no solids are retained on the surface of membranes in said hot filtration zone, said membranes having a membrane area sufficiently large to provide a permeate flowing from said hot filtration zone, at a rate chosen to provide said HRTA;

(l) flowing hot concentrate from said hot filtration zone into said ATAB as a hot concentrate recycle without thickening or hydrolyzing a portion of said hot concentrate;

(m) controlling the flow of said cool concentrate to said ATAB to provide said controlled rate of flow sufficient to concurrently provide (1) sufficient nutrients to maintain a preselected growth rate of said hot cells, and (2) enough water in said autothermal bioreaction zone to equal in volume the amount of permeate removed; and, (n) periodically removing a minor proportion, from 0 to 10% by volume of said hot concentrate recycle to modulate solids content in said autothermal bioreaction zone with essentially no loss of said cells in said mixed liquor, said minor proportion being less than 10% of said biochemically oxidizable material in said feed; whereby, sludge to be disposed of outside said process is less than 20% of the mount one would expect to dispose of in a conventional activated sludge process with the same feed, operating with said mesophilic aerobic bioreactor only, at a HRT of less than 24 hr.

* * * * *